United States Patent [19]

Murakami

[11] 4,023,444
[45] May 17, 1977

[54] PRESSURE CONTROL CIRCUIT FOR USE IN AUTOMATIC TRANSMISSION OF VEHICLE

[75] Inventor: Noboru Murakami, Nagoya, Japan

[73] Assignee: Aisin Seiki Kabushiki Kaisha, Kariya, Japan

[22] Filed: July 17, 1974

[21] Appl. No.: 489,369

[30] Foreign Application Priority Data

July 25, 1973 Japan .............................. 48-83195

[52] U.S. Cl. .............................. 74/868; 192/.032; 192/109 F
[51] Int. Cl.² .................. B60K 41/04; F16K 31/12
[58] Field of Search ............. 192/.032, .076, 87.13, 192/109 F; 74/868, 869

[56] References Cited
UNITED STATES PATENTS

| | | | |
|---|---|---|---|
| 2,756,851 | 7/1956 | Collins | 192/109 F |
| 3,583,422 | 6/1971 | Dach | 192/109 F |
| 3,707,891 | 1/1973 | Asano et al. | 192/109 F |
| 3,714,847 | 2/1973 | Ushijima | 74/868 |
| 3,722,646 | 3/1973 | Oguma | 192/109 F |
| 3,820,417 | 6/1974 | Allen et al. | 192/109 F |

*Primary Examiner*—Benjamin W. Wyche
*Attorney, Agent, or Firm*—Bruce K. Thomas

[57] ABSTRACT

A pressure control circuit for use in connection with an automatic transmission of a vehicle is disclosed which comprises a pressure regulating valve for regulating a hydraulic pressure discharged from a pressure source and for actuating frictional engaging means, said pressure regulating valve including an accumulator, a valve spool and a spring urging said valve spool in one direction, said accumulator including a hydraulic chamber, into which is supplied the hydraulic pressure which will mechanically impart an additional force to said spring at a given value of the hydraulic pressure.

2 Claims, 3 Drawing Figures

PRESSURE CONTROL CIRCUIT FOR USE IN AUTOMATIC TRANSMISSION OF VEHICLE

BACKGROUND OF THE INVENTION

1. Field of the invention

This invention relates to a pressure control circuit for use in an automatic transmission of a vehicle, and more particularly to a pressure control circuit of the type described, which is adapted for use in a pressure regulating circuit for the output hydraulic pressure which operates a frictional engaging means such as the speed change gear of an automatic transmission, a clutch, a brake and the like.

2. Description of the prior art

In general, when the change-over from a forward driving mode to a backward driving mode or vice versa in a speed change gear is accomplished by means of hydraulic control, abrupt engagement of a frictional engaging means will lead to the occurrence of a shock, whereby not only a driver or passengers undergo uncomfortable feeling but also parts of a speed change gear or other associated parts will receive impact, resulting in the failure to provide an intended service life therefor. Hitherto, many attempts have been suggested to remedy a shock which will be experienced upon engagement of the aforesaid engaging means. The common practice adopted for such prior art mechanism is that (i) a discharge pressure from an oil pump is adjusted by means of a pressure regulating valve to a given level which accommodates the maximum load running operation of a motor vehicle, and (ii) there are provided an orifice in the oil line from the pressure regulating valve to an actuator of a clutch or a brake for suppressing or smoothing a pressure rise at a clutch or brake, upon actuation of the actuator, and a hydraulic pressure augmenting or increasing means such as an accumulator, a modulator valve or the like.

However, such attempts only meet partial success in solving this sort of problem, because the hydraulic pressure, which has been regulated by means of the aforesaid pressure regulating valve, i.e., the line pressure still remains high, as compared with the pressure which would be required for a clutch or brake upon their engagement in the normal running of a vehicle, so that there still remains a shock at the time of engagement. Thus, the relief of this sort of shock from a driver or passengers dictates the use of a hydraulic pressure augmenting means having a complicated construction, and hence an increase in size.

SUMMARY OF THE INVENTION

It is accordingly an object of the present invention to provide a pressure control circuit for use in an automatic transmission of a vehicle which will maintain the hydraulic pressure to be supplied to the frictional engaging means to a value commensurate to an engaging force required by the aforesaid frictional engaging means, until the aforesaid frictional engaging means has completed the intended engagement or for an additional certain period of time thereafter, and which is adapted to urge a pressure control valve with a valve spool shifting in an accumulator, after completion of the aforesaid engagement, to thereby increase the pressure to be supplied to the frictional engaging means.

It is a further object of the present invention to provide a pressure control circuit for an automatic transmission of a vehicle which relieves a shock arising from the engagement of a frictional engaging means and also lessens the shock to a level commensurate with the decrease or increase in the engaging force of the frictional engaging means by using a pressure of a level in response to an output of an engine.

These and other objects and features of the present invention are readily attained in a pressure control circuit for use in an automatic transmission of a vehicle which comprises: a hydraulic pressure source; a pressure regulating valve for regulating a hydraulic pressure from said hydraulic pressure source, said pressure regulating valve provided with a valve spool having portions of different cross sectional areas, a spring for urging said valve spool in one direction to increase the hydraulic pressure, a discharge port, an input port and an output port, said valve spool being adapted to be shifted in an opposite direction against the said spring acting in said one direction, whereby said discharge port may be opened or closed, and said input port being communicated with said hydraulc pressure source at all times; an actuator in communication with said output port of said pressure regulating valve and adapted to be actuated due to the hydraulic pressure regulated by said pressure regulating valve; a first line means for communicating said hydraulic pressure source with said actuator; and accumulator provided within said pressure regulating valve in said opposite direction with respect to said valve spool, and having a piston, a spring for urging said piston in said opposite direction and a hydraulic pressure chamber is positioned on the opposite side of said spring with respect to said piston; a second line means branched from said first line means and communicating with said hydraulic pressure chamber in said accumulator; and an orifice means located between the branching point of said second line means and said hydraulic pressure source; whereby during the time which the hydraulic pressure in said second line means is maintained to below a given value, said piston in said accumulator is biased against the action of said spring in said one direction, and when said hydraulic pressure in said second line means reaches said given value, said piston in said accumulator will abut said valve spool in said pressure regulating valve to thereby mechanically impart an urging force to said piston in said one direction.

DESCRIPTION OF THE PREFERRED EMBODIMENTS

Figure 1:
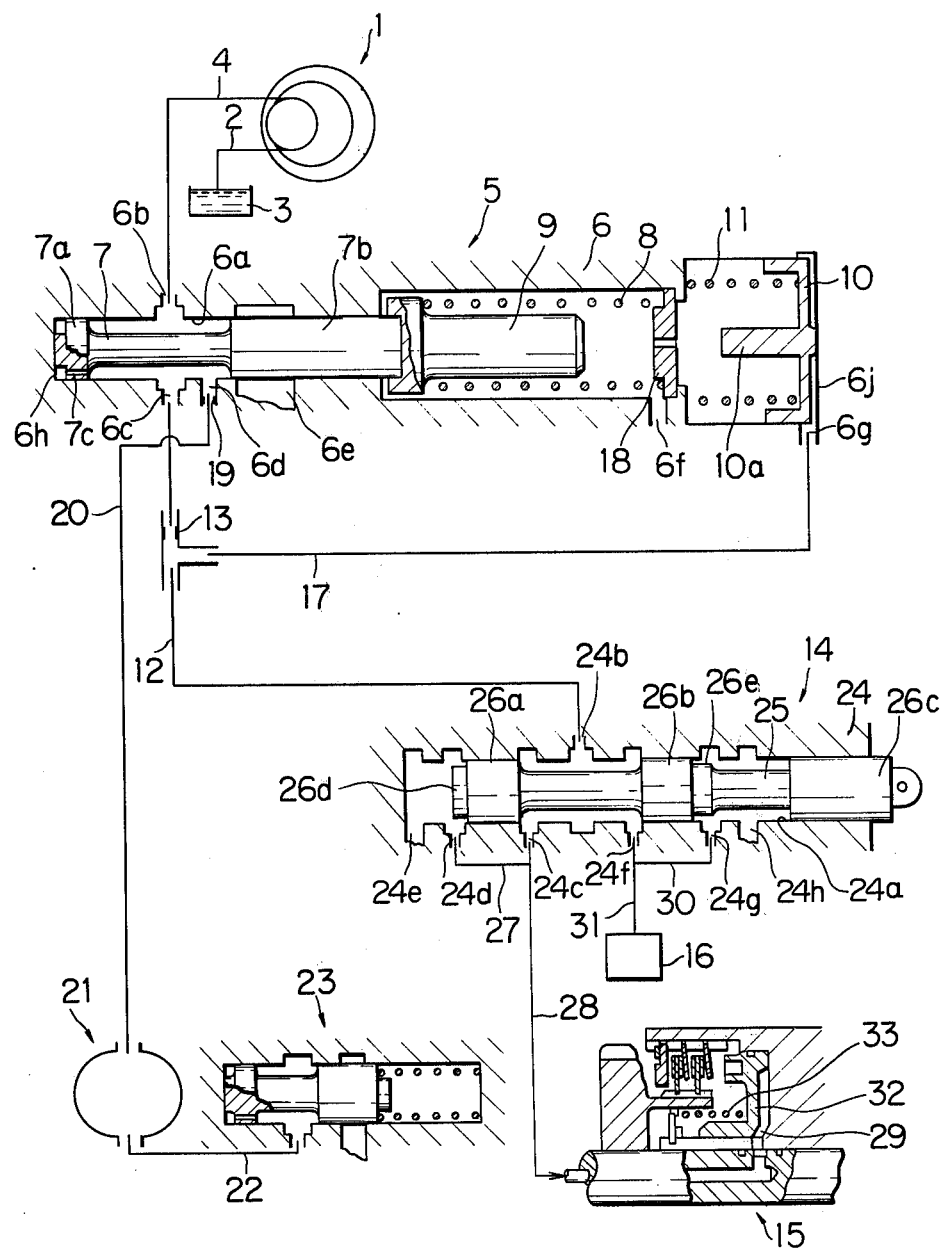
FIG. 1 is a pressure control circuit for use in an automatic transmission of a vehicle, showing one embodiment of the present invention.

Referring now to FIG. 1, there is shown a hydraulic circuit diaphragm, in which a control circuit according to the present invention is applied to a hydraulic circuit of a single forward-speed-ratio and single-reverse-speed-ratio-torque converter, speed change gear for an industrial vehicle. Shown at 1 is an oil pump adapted to introduce oil through an oil line 2 from an oil reservoir 3 and to discharge the oil under pressure into a discharge oil line 4. Shown at 5 is a pressure regulating valve having an elongated valve body 6, a valve spool 7 slidably fitted in sealed relationship within a valve bore 6a in the valve body 6, and a spring seat member 9 adapted to transmit a tension of a spring 8 to the valve spool 7. Provided in the rear of and in series to the spring 8 of the pressure regulating valve 5 is an accumulator piston 10, which is urged under the action of a spring 11 to the right as viewed in FIG. 1. An orifice 13 is provided midway in the high pressure oil line 12 leading from the pressure regulating valve 5. The branch oil line 17, leads from a position close to the orifice 13 to the righthand end closure for the accumulator piston 10 so as to cause the hydraulic pressure to act on the righthand end face of the piston 10. The main line 12 connects to the manual shift valve 14 controlling the forward clutch 15 and the reverse clutch 16 through the line 31. A projecting portion 10a extends from the center of the accumulator piston 10 toward the pressure regulating valve 5 and is adapted to urge a seat 18 of the spring 8, when the piston 10 is displaced by high pressure oil from the line 17. The valve body 6 of the pressure regulating valve 5 is provided with a number of ports namely the inlet port 6b, discharge ports 6c, 6d, the discharge ports 6e, 6f, and the inlet port 6g, a valve chamber 6h and an accumulator chamber 6j, with the port 6b in communication with the discharge oil line 4. The ports 6e and 6f serve to discharge oil line 4. The ports 6e and 6f serve to discharge hydraulic fluid therethrough back to the oil reservoir 3. The port 6d is provided with an orifice 19, and is' communicated by way of an oil line 20 with a torque converter 21. The torque converter 21 is connected by way of an oil line 22 to a pressure regulating valve 23 for regulating the pressure at the exit of the torque converter. The port 6c is communicated with the inlet port 24b in the manual shifting valve 14 by way of the oil line 12 having the orifice 13 therein. The manual shift valve 14 has a valve body 24 having a valve bore 24a and a valve member 25. The valve body 24 has therein the ports 24b, 24d, 24e, 24f, 24g, and 24h adapted to communicate with the valve bore 24a. The valve 25 has large diameter portions 26a, 26b, 26c and which are slidably fitted in the valve bore 24a in sealed relationship, and small diameter portions 26d and, 26e. The ports 24e and 24h are discharge ports leading to the oil reservoir 3, while the port 24c is communicated by way of an oil line 27 with the port 24d, the oil line 27 being communicated by way of an oil line 28 with a supply chamber 29 for the forward speed clutch 15. Furthermore, the port 24f is in communication with the port 24g by way of an oil line 30, which in turn is connected by way of an oil line 31 to a reverse speed clutch 16. The port designated 32 is a piston and shown at 33 is a return spring for the piston 32 operating within the supply chamber 29 of the forward clutch 15 in a known manner.

Description will now be made of the operation by referring to the embodiment shown in FIG. 1. The valve member 25 of the manual shift valve 14 is in its neutral position and thus the oil discharged from the oil pump 1 is discharged through oil lines 4, 27 and, 30 back into the oil reservoir 3. In this respect, the hydraulic pressure will be increased upstream of the orifice 13 in the oil line 12 due to the action of the orifice 13. However, the hydraulic pressure thus increased is so low that even if this hydraulic pressure is introduced into a chamber 6h through an orifice 7c provided in a large diameter portion 7a of the valve spool 7, it will not displace the valve spool 7 to the right by overcoming the tension of the spring 8, and hence the valve spool 7 will remain in its neutral position closing the discharge port 6e. As a result, the hydraulic oil in the line 4 will be introduced to the torque converter 21 via port 6d, orifice 19 and oil line 20, whereby the hydraulic oil required for the torque converter 21 will be supplied thereto. Under such a condition, if the valve 25 in the manual shift valve 14 is shifted to the left as viewed in the drawing, the large diameter portions 26a and 26b of the valve 25 will close the ports 24d and 24f, so that the hydraulic oil in the oil line 12 will be supplied to the forward speed clutch 15. This will increase the hydraulic pressure in the oil line 12 and the hydraulic pressure in the chamber 6g, thereby biasing the valve spool 7 in the pressure regulating valve 5 to the right by overcoming the action of the spring 8, such that the hydraulic pressure will be regulated to a pressure commensurate to the urging force of the spring 8, when the large diameter portion 7b of the valve spool 7 almost opens the discharge port 6e. The hydraulic pressure thus regulated is so adjusted beforehand to a level sufficient for the initial engagement of the clutches 15 and 16. As long as the piston 32 of the clutch 15 is being biased so as to cause the engagement in the clutch 15, the hydraulic pressure in the oil line 28 will be maintained to a level commensurate to a spring force of the return spring 33 of the piston 32. When the accumulator piston 10 is biased to an extent until completion of the clutch, the accumulator piston 10 will urge the spring seat 18 so as to increase a force of the spring 8, thereby increasing a control pressure for the pressure regulating valve 5. The description given thus far refers to the case where the manual shift valve 14 is displaced to the forward position. However, the same description will apply to the case where the manual shift valve is displaced to the backward position.

Figure 2:
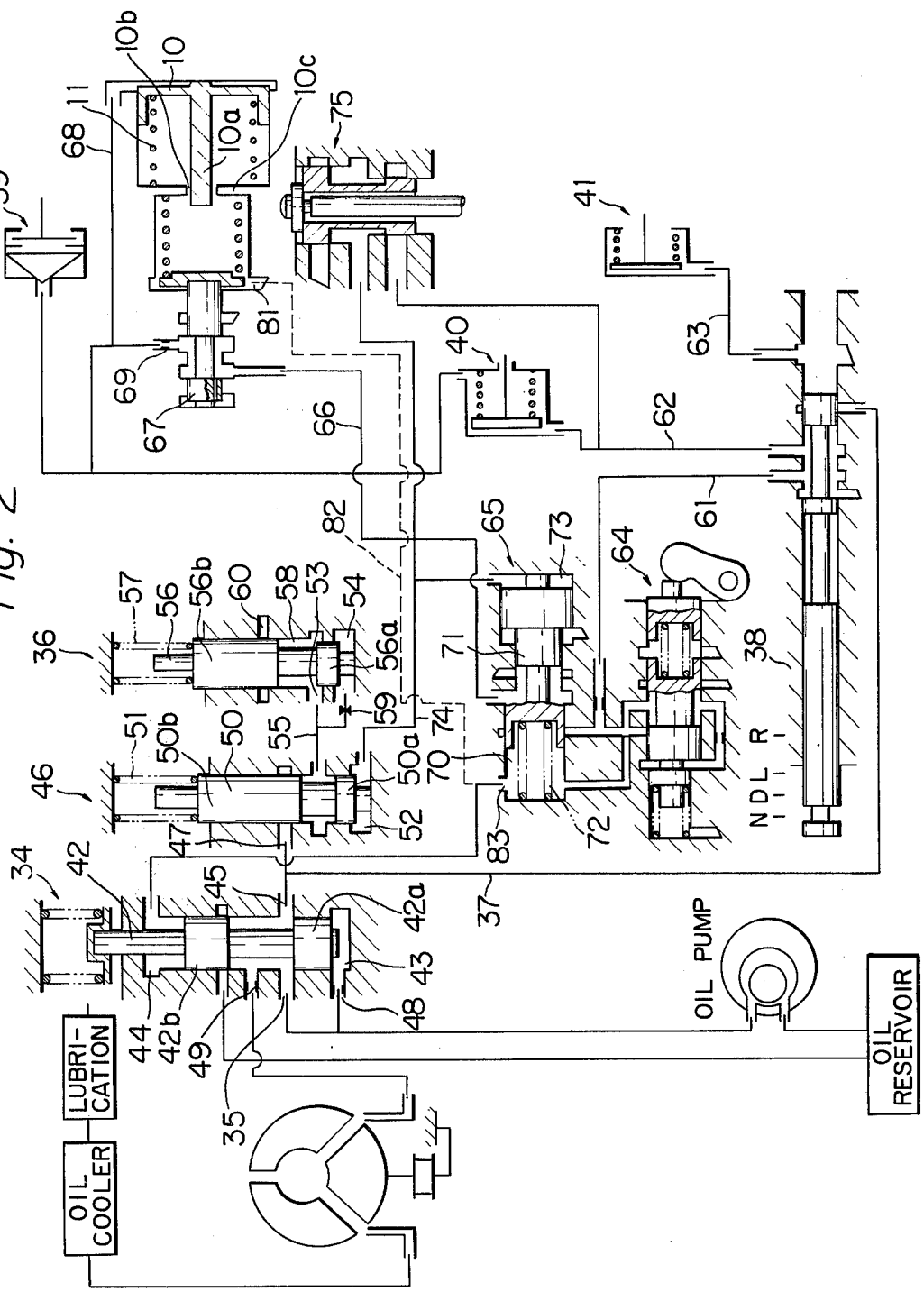
FIG. 2 shows another embodiment of the present invention, the line shown by a broken line representing a further embodiment of the present invention.
Figure 3:
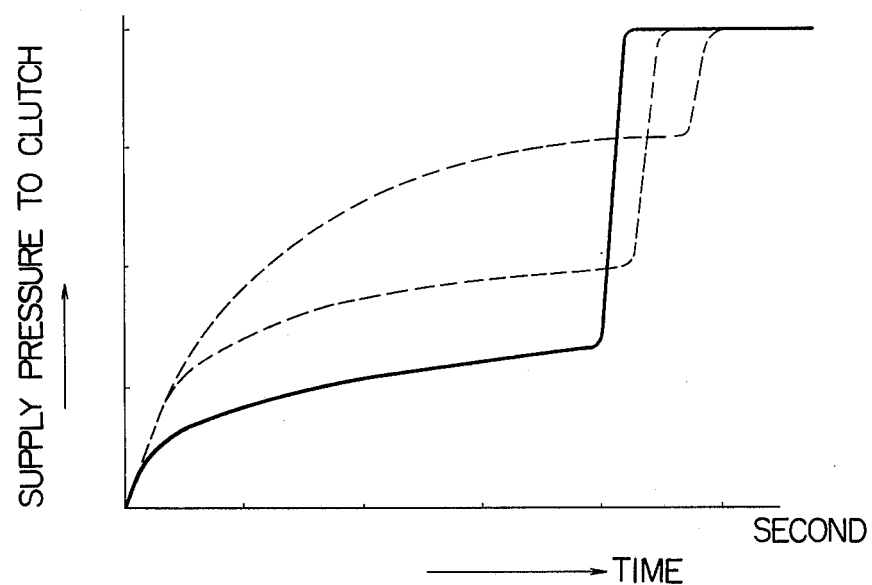
FIG. 3 is a plot showing the pressure to be supplied to a frictional engaging means embodying the present invention, in which the solid lines represent the embodiments of FIG. 1 and FIG. 2, while the broken line represents the further embodiment of FIG. 2.

FIG. 2 refers to another embodiment of the present invention. Shown at 34 is a first regulator valve, in which the pressure oil from an oil pump is received in a port 35 and a chamber 43 to thereby regulate the pressure to a given higher level, while a manual shift valve 38 is connected to an oil line for suppling a high-pressure-line which has been regulated by a first regulator valve 34 or the low-pressure-line pressure which has been regulated by a second regulator valve 36, whereby either one of the pressures in the aforesaid both high and low pressure lines is selectively supplied to a frictional engaging means, i.e., a clutch 39, brake 40 or 41 to operate same, thus causing the speed change gear to establish a different driving ratio. The first regulator valve 34 has a valve member 42 provided with two lands 42a and 42b of the same diameter, and chambers 43 and 44 adapted to apply the hydraulic pressure to the lands 42a and 42b, with a line pressure intake port 45 in the first regulator valve 34 communicating through the oil line 37 with the port 47 in the regulator cut-off valve 46. Shown at 48 is an orifice which is adapted to absorb the surge in the hydraulic oil to be supplied to the chamber 43 and prevents the vibration of the valve 42, while the orifice 49 serves to regulate the flow rate of the circulating oil to the torque converter. The regulator cut-off valve 46 has a valve member 50 having two lands 50a and 50b, and a spring 51 acting downwardly all the time, whereby the regulator cut-off valve 46 is normally in the position as shown in FIG. 2, due to the action of a spring 51. At this time, the port 47 in communication with the oil line 37 is closed by means of the land 50b. On the other hand, the valve member 50 will be displaced upwardly, when the governor pressure exerting to the interior of the chamber 52 is beyond a predetermined value and thus overcomes a downward force of the spring 51, thereby bringing the port 47 in communication with an oil line 55 connecting with the port 53 and chamber 54 in the second regulator valve 36 through the cavity confined between the lands 50a and 50b. The second regulator valve 36 has a valve member 56 having two lands 56a and 56b, and a spring 57 adapted to act downwardly, whereby the hydraulic pressure introduced through the port 53 into the chamber 58 causes the land 56b to be biased to open the discharge port 60 at the same pressure as the hydraulic pressure which has been introduced into the chamber 54 through the orifice for preventing vibration, thereby providing a line pressure regulated to below the high-pressure-line pressure which is regulated by means of the first regulator valve 34. Subsequently, when in 'N' position, the manual shift valve 38 blocks the oil line 37, with the oil lines 61, 62 and 63 in communication with the discharge ports, while the clutch 39 and brakes 40 and 41 are left disengaged, presenting a neutral condition. When the manual shift valve 38 is brought to the 'D' position, then the oil line 37 will be communicated with the oil lines 61 and 62, and on the other hand, when in the 'L' position, the oil line 37 will be communicated only with the oil line 62. Furthermore, when in the 'R' position, the oil line 37 will be communicated only with the oil line 63 which is in communication with an engaging chamber in the second brake 41. On the other hand, the oil line 61 is communicated with a supply port in a throttle valve 64 and a shift valve 65. The throttle valve 64 regulates the throttle pressure commensurate to the opening position of an engine throttle valve (not shown), thereby supplying the aforesaid throttle pressure to a chamber 70 in the shift valve 65 and to a chamber 44 in the first regulator valve 34. When the governor pressure in the chamber 70 in the shift valve 65 exceeds a predetermined pressure, then the pressure oil in the oil line 61 will be supplied by way of the oil line 66 to a pressure control valve spool 67 and then the hydraulic pressure is exerted by way of the oil line 68 to the righthand face of the accumulator piston 10 as well as to a supply chamber of the clutch 39 and a release chamber of the brake 40. Furthermore, an orifice 69 is provided in the rear of the pressure control valve spool 67, with an accumulator piston 10 interposed between the orifice 69 and the clutch 39, so that when the piston 10 is biased to a sufficient extent, the piston 10 will urge the pressure control valve spool 67 so as to stop its controlling action as well as to increase the clutch pressure, while causing the throttle pressure to act on the side of the spring 11 of the accumulator piston 10 as well as on the side of the spring 84 of the pressure control valve spool 67 to thereby bring the clutch pressure in responsing relation to the throttle pressure. Confined within a chamber 40 in the shift valve 65 is a spring 72 adapted to urge a valve 71 to the right, while there is provided a chamber 73, into which is supplied a governor pressure, on the side counteracting a force of the spring 72 and a force created by the throttle pressure, with the chamber 73 in communicaton with the oil line 74. Designated 75 is a governor valve communicating with the oil lines 62 and 74.

Now, description will be made of the operation by referring to the embodiment shown in FIG. 2, which represents a neutral position. The high-pressure-line pressure which has been regulated to a given high pressure by means of the first regulator valve 34 is supplied to the oil line 37, while the aforesaid high pressure is blocked by the manual shift valve 38 and thus leads to no other line, so that the clutch 39 and brakes 40 and 41 are not maintained in an engaged condition. On the other hand, the line pressure in the oil line 37 leading to the regulator cut-off valve 46 is blocked by the land 50b in the valve 50, so that the high pressure regulated by the first regulator valve 34 will be applied to the oil line 37. If the manual shift valve 38 is biased on the 'D' position from this condition, then the line pressure in the oil line 37 will be introduced into the oil lines 61 and 62.

The high-pressure-line pressure introduced into the oil line 62 will be supplied to a supply chamber in the first brake 40 to thereby bring the brake into engagement, as well as to the governor valve 75. The high-pressure-line pressure which has been introduced into the oil line 61 at this time is communicated with supply ports in the shift valve 65 and throttle valve 64. As a result, the throttle valve 64 will produce a pressure in response to the opening position of the throttle valve of an engine, and then the throttle pressure thus produced will be supplied to a chamber 70 so as to cause downshifting of the valve 65. Supplied to a chamber 73 which attends upon the upward-shifting and is positioned on the opposite side to the chamber 70 in the shift valve 65 is a governor pressure from a governor valve 75, so that the operation of the shift valve 65 may be controlled depending on the comparison of the governor pressure with the throttle pressure. On the other hand, the throttle pressure which has been introduced into a pressure augmenting chamber 44 in the first regulator valve 34 serves to regulate the high-pressure-line pressure regulated by the first regulator valve 34 to a higher level commensurate to the opening position of the throttle valve of a engine at that time.

The throttle pressure which has been introduced into the chamber 70 in the shift valve 65 will bias the valve 71 to the right as viewed on the drawing against the governor pressure in the chamber 73, in cooperation with the spring 72. As a result, until the governor pressure is increased to a sufficient pressure, the valve 71 in the shift valve 65 will continue to block the communication with the oil lines 61 and 62. As a result, when the speed of a vehicle is low and the governor pressure is not increased to a desired level, the aforeward low speed mode will result, when the valve 38 is in the 'D' position. Under such a condition, if the speed of a vehicle is increased and thus the governor pressure in the chamber 73 in the shift valve 65 overcomes the action of the spring 72 to thereby bias the valve 71 to the left, then the line pressure in the oil line 61 will be introduced via oil line 66, orifice 69 and oil line 68 to the righthand face of the accumulator piston 10 as well as to the engaging chamber in the clutch 8 and to the release chamber in the brake 40. It follows that the pressure rise in the release chamber will be controlled by means of the operation of the pressure control valve spool 67 and the accumulator piston 10, thus bringing the clutch 8 in to smooth engagement. Upon completion of engagement of the clutch 8, the projecting portion 10a of the accumulator piston 10 will directly urge the pressure control valve spool 67 through an opening 10b provided in the wall 10c defining two chambers on the opposite sides thereof to thereby stop its controlling action and increase the clutch pressure, while it will release the first brake to provide a forward high speed mode.

Furthermore, in case the throttle pressure is introduced from the outlet 83 in the shift valve 65 through the line 82 into the inlet 81 in the pressure regulating valve, the pressure rise in the engaging chamber in the clutch 8 as well as in the release chamber in the brake 40 is controlled to a pressure commensurate to the throttle pressure by means of the pressure control valve spool 67, thus producing a torque in response to an output torque of an engine, with the result of a smooth engagement of the clutch 8. Then, upon completion of engagement of the clutch 8, the projecting portion 10a of the accumulator piston 10 will directly urge the control valve spool 67. This will stop the controlling action of the valve spool 67, lead the increased pressure to the clutch to bring the clutch 8 in engagement and release the brake 40, thus completing the shifting to the forward high speed mode.

As is apparent from the foregoing description, according to the present invention, the supply pressure until the engagement of the frictional engaging means will be maintained to a low pressure, while in case the throttle pressure is introduced, it is maintained to a level commensurate to the throttle pressure. Upon completion of engagement, an augmented pressure is applied to the pressure control valve according to the stroke of the accumulator to thereby increase the supply pressure, while increasing the capacity of the engaging means, thus facilitating the design of an orifice accumulator. According to one aspect of the present invention, an accumulator and a valve body are connected to the pressure control valve on the side to increase the pressure in the aforesaid pressure control valve, so that positive operation will result with the additional advantages of less sliding resistance and the like, due to the direct urging of the piston.

The invention has been described in detail with particular reference to the preferred embodiment and alternative embodiments thereof, but it will be understood that variations and modifications can be effected within the spirit and scope of the invention.

What is claimed is:

1. A pressure control circuit for use in an automatic transmission of a vehicle, comprising:
    a hydraulic pressure source;
    a pressure regulating valve for regulating a hydraulic pressure from said hydraulic pressure source, said pressure regulating valve having a valve spool having portions of different cross-sectional areas, a spring for urging said valve spool in one direction to increase a hydraulic pressure, a discharge port, an input port and an output port, said valve spool being adapted to be shifted in an opposite direction against the said spring acting in said one direction, whereby said discharge port may be opened or closed, and said input port being communicated with said hydraulic pressure source at times;
    an actuator in communication with said output port of said pressure regulating valve and adapted to be actuated due to the hydraulic line pressure regulated by said pressure regulating valve;
    a first line means for communicating said hydraulic pressure source with said actuator; an accumulator provided within said pressure regulating valve on said opposite direction with respect to said valve spool, and having a piston, a spring for urging said piston in said opposite direction and a hydraulic pressure chamber positioned on the opposite side of said spring with respect to said piston;
    a second line means branched from said first line means and communicating with said hydraulic pressure chamber in said accumulator;
    an orifice means located between the branching point of said second line means and said hydraulic pressure source;
    whereby during the time which the hydraulic pressure in said second line means is maintained to below a given value, said secondly referred piston in said accumulator is biased by the action of said spring in said opposite direction, and when said hydraulic pressure in said second line means reaches said given value, said piston in said accumulator will abut said valve spool in said pressure regulating valve to thereby mechanically impart an urging force to said piston in said one direction;
    a plurality of frictional engaging means operated under said line pressure;
    a governor valve for producing a governor pressure which is increased or decreased in response to the speed of said vehicle;
    a manual shift valve operably communicated with said regulator means and for supplying said line pressure to said frictional engaging means;
    a throttle valve hydraulically communicated with said shift valve for producing a throttle pressure commensurate to an engine torque demand;
    a shift valve hydraulically communicated with said manual shift valve and operable in response to the governor pressure and the throttle pressure for automatically and selectively actuating said frictional engaging means by way of said first line means; and
    a third line means in said circuit, said throttle pressure being supplied through said third line means to one of said both chambers all the time, thereby imparting a force to said spring to urge the piston of said accumulator in said one direction.

2. A pressure control circuit for use in an automatic transmission of a vehicle, as set forth in claim 1, wherein said orifice means is provided in said output port of said pressure regulating valve.

* * * * *

UNITED STATES PATENT OFFICE
CERTIFICATE OF CORRECTION

PATENT NO. : 4,023,444
DATED : May 17, 1977
INVENTOR(S) : Noboru Murakami

It is certified that error appears in the above-identified patent and that said Letters Patent are hereby corrected as shown below:

IN THE SPECIFICATION:

Column 3, line 29, after "line 4.", delete "The ports 6e and 6f serve to discharge oil line 4."; and line 55, delete "port" and insert -- part --

Column 4, line 6, before "line" insert -- oil --;

line 31, after "the" insert -- engagement of the ----; and line 46, after "-line", insert -- pressure - line 61, delete "40" and insert -- 70 --.

UNITED STATES PATENT OFFICE
CERTIFICATE OF CORRECTION

Patent No. 4,023,444      Dated May 17, 1977

Inventor(s) Noboru Murakami

It is certified that error appears in the above-identified patent and that said Letters Patent are hereby corrected as shown below:

Column 6, line 8 after "other" insert -- oil --; and line 14, delete "on" and insert -- to --.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*